(12) United States Patent
Rao et al.

(10) Patent No.: US 10,098,087 B2
(45) Date of Patent: Oct. 9, 2018

(54) LOCATION-ASSISTED SERVICE CAPABILITY MONITORING

(71) Applicant: Apple Inc., Cupertino, CA (US)

(72) Inventors: Bharath Narasimha Rao, Sunnyvale, CA (US); Cherif Jazra, Los Altos, CA (US); Leonardo A. Soto Matamala, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/457,796

(22) Filed: Mar. 13, 2017

(65) Prior Publication Data

US 2017/0188331 A1    Jun. 29, 2017

Related U.S. Application Data

(63) Continuation of application No. 13/743,242, filed on Jan. 16, 2013, now Pat. No. 9,596,670.

(51) Int. Cl.
*H04W 64/00* (2009.01)
*H04W 4/029* (2018.01)
(Continued)

(52) U.S. Cl.
CPC .......... *H04W 64/006* (2013.01); *G01C 21/32* (2013.01); *H04B 17/309* (2015.01);
(Continued)

(58) Field of Classification Search
CPC .. H04W 64/006; H04W 4/028; H04B 17/309; H04L 67/2847
See application file for complete search history.

(56) References Cited

U.S. PATENT DOCUMENTS

| 5,448,773 A | 9/1995 | McBurney et al. |
| 6,236,933 B1 | 5/2001 | Lang |

(Continued)

FOREIGN PATENT DOCUMENTS

| DE | 10025725 A1 | 12/2001 |
| EP | 1777890 A1 | 4/2007 |

(Continued)

OTHER PUBLICATIONS

"Final Office Action", U.S. Appl. No. 13/601,804, dated Apr. 21, 2014, 19 pages.

(Continued)

*Primary Examiner* — Brandon J Miller
(74) *Attorney, Agent, or Firm* — Kilpatrick Townsend & Stockton LLP

(57) ABSTRACT

A digitally stored map can indicate the signal quality for each of the map's regions. A device can determine its location, speed, and direction using global positioning system (GPS) and other sensors. Based on this information, the mobile device can predict a field of locations within which the device will probably be located within a specified future time frame. Based on both the information indicating signal quality and the probable future field of locations, the device can estimate a moment at which the device will probably begin to suffer from low-quality or absent signal. Using this prediction, the device can proactively perform a variety of anticipatory remedial actions. For example, the device can begin allocating a greater portion of currently available wireless network communication bandwidth to the reception of data packets that represent content that is being streamed to the device, so that the device can proactively buffer those packets.

21 Claims, 12 Drawing Sheets

(51) Int. Cl.
*H04B 17/309* (2015.01)
*G01C 21/32* (2006.01)
*H04L 29/06* (2006.01)
*H04W 4/02* (2018.01)
*H04L 29/08* (2006.01)
*H04W 4/021* (2018.01)

(52) U.S. Cl.
CPC .......... *H04L 65/4084* (2013.01); *H04L 65/80* (2013.01); *H04L 67/2847* (2013.01); *H04W 4/022* (2013.01); *H04W 4/029* (2018.02)

(56) References Cited

U.S. PATENT DOCUMENTS

| | | |
|---|---|---|
| 6,597,906 B1 | 7/2003 | Van Leeuwen et al. |
| 6,721,572 B1 | 4/2004 | Smith et al. |
| 6,871,139 B2 | 3/2005 | Liu et al. |
| 7,020,468 B2 | 3/2006 | Squibbs et al. |
| 7,127,213 B2 | 10/2006 | Haymes et al. |
| 7,317,914 B2 | 1/2008 | Adya et al. |
| 7,328,023 B2 * | 2/2008 | Fattouch ............... H04W 16/18 455/446 |
| 7,328,323 B1 | 2/2008 | Conover |
| 7,359,718 B2 | 4/2008 | Tao et al. |
| 7,603,115 B2 | 10/2009 | Banavar et al. |
| 7,965,881 B2 | 6/2011 | Reese et al. |
| 8,010,101 B2 | 8/2011 | Bugenhagen |
| 8,095,146 B2 | 1/2012 | Raghavachari |
| 8,103,441 B2 * | 1/2012 | Callaghan ............... G01C 21/26 701/457 |
| 8,164,599 B1 | 4/2012 | Kadous et al. |
| 8,364,089 B2 | 1/2013 | Phillips |
| 8,417,239 B1 | 4/2013 | Decusatis et al. |
| 8,467,768 B2 | 6/2013 | Mahaffey et al. |
| 8,560,237 B2 | 10/2013 | Rudow et al. |
| 8,589,070 B2 | 11/2013 | Ban et al. |
| 8,694,245 B2 | 4/2014 | Zubas et al. |
| 9,043,135 B2 | 5/2015 | Dave et al. |
| 9,057,620 B2 | 6/2015 | Dave et al. |
| 9,222,787 B2 | 12/2015 | Blumenberg et al. |
| 9,432,961 B2 * | 8/2016 | Rao ...................... H04L 67/2847 |
| 9,596,670 B2 * | 3/2017 | Rao ...................... H04L 67/2847 |
| 9,596,679 B2 | 3/2017 | Elinav et al. |
| 2006/0089793 A1 | 4/2006 | Rudow et al. |
| 2006/0135180 A1 | 6/2006 | Jakel et al. |
| 2008/0004037 A1 | 1/2008 | Achlioptas et al. |
| 2008/0009324 A1 | 1/2008 | Patel |
| 2008/0132249 A1 | 6/2008 | Hamilton |
| 2009/0005097 A1 * | 1/2009 | Shaffer ................ G01C 21/20 455/517 |
| 2009/0017840 A1 * | 1/2009 | Camp, Jr. ............ G01C 21/367 455/456.3 |
| 2009/0177383 A1 | 7/2009 | Tertoolen |
| 2009/0216442 A1 * | 8/2009 | Luert .................... G01C 21/30 701/431 |
| 2009/0228199 A1 | 9/2009 | Bhogal et al. |
| 2009/0247137 A1 | 10/2009 | Awad |
| 2009/0326810 A1 | 12/2009 | Callaghan et al. |
| 2010/0240346 A1 | 9/2010 | Jain et al. |
| 2010/0250269 A1 | 9/2010 | Rappaport |
| 2011/0071759 A1 | 3/2011 | Pande et al. |
| 2011/0167128 A1 | 7/2011 | Raghunathan et al. |
| 2011/0207509 A1 * | 8/2011 | Crawford ............ H04W 52/0245 455/574 |
| 2011/0269476 A1 | 11/2011 | Kumar et al. |
| 2012/0009890 A1 * | 1/2012 | Curcio .................. H04L 29/06 455/230 |
| 2012/0131212 A1 | 5/2012 | Tang et al. |
| 2012/0135748 A1 * | 5/2012 | Lee ...................... H04W 4/185 455/456.1 |
| 2012/0143499 A1 | 6/2012 | Petersen |
| 2012/0315918 A1 | 12/2012 | Kadous |
| 2013/0018581 A1 | 1/2013 | Sidhu et al. |
| 2013/0024107 A1 | 1/2013 | Xie et al. |
| 2013/0035110 A1 | 2/2013 | Sridhara et al. |
| 2013/0044957 A1 | 2/2013 | Khorashadi et al. |
| 2013/0122935 A1 | 5/2013 | Das et al. |
| 2013/0143590 A1 | 6/2013 | Sridhara et al. |
| 2013/0310055 A1 * | 11/2013 | Dewing ............... H04W 76/025 455/450 |
| 2013/0321424 A1 | 12/2013 | Pylappan et al. |
| 2014/0067257 A1 | 3/2014 | Dave et al. |
| 2014/0199980 A1 | 7/2014 | Rao et al. |
| 2014/0200038 A1 | 7/2014 | Rao et al. |
| 2015/0117238 A1 | 4/2015 | Kronestedt et al. |
| 2015/0142301 A1 | 5/2015 | Dave et al. |
| 2016/0205657 A1 | 7/2016 | Rao et al. |

FOREIGN PATENT DOCUMENTS

| | | |
|---|---|---|
| EP | 2073486 A1 | 6/2009 |
| WO | 2014113214 A1 | 7/2014 |

OTHER PUBLICATIONS

"Non-Final Office Action", U.S. Appl. No. 13/601,804, dated Oct. 18, 2013, 18 pages.
"Notice of Allowance", U.S. Appl. No. 13/601,804, dated Mar. 30, 2015, 12 pages.
"Notice of Allowance", U.S. Appl. No. 13/601,804, dated Oct. 16, 2014, 12 pages.
"Notice of Allowance", U.S. Appl. No. 13/743,242, dated Nov. 23, 2016, 8 pages.
"Final Office Action", U.S. Appl. No. 131/43,242, dated Sep. 22, 2015, 11 pages.
"Non-Final Office Action", U.S. Appl. No. 13/743,242, dated Mar. 10, 2015, 17 pages.
"Non-Final Office Action", U.S. Appl. No. 13/743,242, dated May 5, 2016, 14 pages.
"Notice of Allowance", U.S. Appl. No. 13/743,242, dated Dec. 30, 2015, 10 pages.
"Notice of Allowance", U.S. Appl. No. 13/743,246, dated May 6, 2016, 7 pages.
"Final Office Action", U.S. Appl. No. 131/43,246, dated May 4, 2015, 19 pages.
"Non-Final Office Action", U.S. Appl. No. 13/743,246, dated Dec. 18, 2014, 13 pages.
"Non-Final Office Action", U.S. Appl. No. 13/743,246, dated Sep. 10, 2015, 15 pages.
"Notice of Allowance", U.S. Appl. No. 13/743,246, dated Jan. 15, 2016, 9 pages.
"Notice of Allowance", U.S. Appl. No. 14/602,873, dated May 5, 2015, 14 pages.
"International Search Report and Written Opinion", PCT/US2013/078552, dated Mar. 21, 2014, 11 pages.
"International Preliminary Report on Patentability", PCT/US2013/078552, dated Jul. 30, 2015, 8 pages.
"International Search Report and Written Opinion", PCT/US2014/010672, dated Mar. 21, 2014, 11 Pages.
"International Preliminary Report on Patentability", PCT/US2014/010672, dated Jul. 30, 2015, 8 pages.
Weber, et al., "Mobile Map Browsers: Anticipated User Interaction for Data Pre-Fetching", University of Maine, 2010, 113 pages.
U.S. Appl. No. 15/077,716 , "Non-Final Office Action", dated Sep. 15, 2017, 21 pages.
U.S. Appl. No. 15/664,227 , "Non-Final Office Action", dated Sep. 22, 2017, 15 pages.
U.S. Appl. No. 15/664,227, "Notice of Allowance", dated Jan. 18, 2018, 14 pages.
Final Office Action for U.S. Appl. No. 15/077,716 dated Feb. 27, 2018, 22 pages.

* cited by examiner

LOCATION-ASSISTED SERVICE CAPABILITY MONITORING

CROSS-REFERENCE TO RELATED APPLICATION

This application is a continuation of U.S. patent application Ser. No. 13/743,242, filed Jan. 16, 2013, the disclosure of which is hereby incorporated by reference in its entirety.

BACKGROUND

The present disclosure relates generally to mobile communications, and in particular to techniques for adapting, during travel, to environments that have weak or no mobile communication network access.

Computers and other electronic devices can communicate with each other over networks such as local area networks, wide area networks, and the Internet. Mobile devices such as cell phones, including so-called smart phones, can communicate with each other wirelessly over a variety of wireless networks including 3G and 4G networks. Smart phones can send data packets over such networks, and through the Internet, to various servers, and can receive information from such servers through similar channels. In this manner, a user of a smart phone can view web pages, listen to music, and watch videos obtained from a remote server while that user is traveling. A smart phone can also send, to other smart phones, data packets that represent audio or textual communications. These data packets, traveling through the networks, contain fragments of audible or textual conversations between the users of the smart phones. However, typically, a mobile device can only send and receive data packets while that mobile device has access to a wireless network.

As a user of a mobile device travels from one area to another, the user may encounter locations in which access to a wireless network is limited or non-existent. This may occur, for example, when the user has traveled nearly or entirely out of range of a signal tower or wireless access point. Until the mobile device comes back within range of the same or another signal tower or wireless access point, the mobile device may be unable to conduct any communications with the external world. If a mobile device user is involved in an important conversation or using an important network-based service at the time that the user enters into a zone in which signal strength is weak or absent, then the user may become frustrated at unexpectedly having his important activity interrupted for some period of time.

SUMMARY

Certain embodiments of the invention can make use of information that specifies network communication signal strength or quality in various geographical regions. For example, a digitally stored map can indicate, for each region on the map, the network communication signal strength or quality within that region. A mobile device can determine its present location using a device-internal mechanism such as global positioning system (GPS). Using built-in sensors such as a GPS, compass, accelerometer, gyroscope, and barometer, a mobile device also can determine its present speed and direction of travel. Based on this location, speed, and direction information, the mobile device can predict a field of geographical locations within which the mobile device will probably be located within a specified future time frame. Based on both the information indicating geographical network communication signal quality and the probable future field of geographical locations, the mobile device can estimate a moment in the future at which the mobile device will probably begin to suffer from low-quality or absent network communication signal. Using this prediction, the mobile device can proactively perform a variety of anticipatory remedial actions.

For example, in response to determining that the mobile device is likely to enter a communication "dead zone" within ten minutes, the mobile device can begin allocating a greater portion of currently available wireless network communication bandwidth to the reception of data packets that represent music or video that is currently being streamed to or downloaded to the mobile device, so that the mobile device can proactively buffer those data packets. The mobile device can then continue to play the music or video from the buffered data packets even after the mobile device has entered the communication dead zone. For another example, in response to making such a determination, the mobile device can alert the user, prior to the user's entry into the communication dead zone, that the path on which the user is traveling will lead the user into a communication dead zone within a specified amount of time, so that the user can stop, change course, or take other action.

The techniques described herein can be used in a variety of travel scenarios. The particular means of transportation do not necessarily limit application of the techniques described herein. For example, techniques described herein can be used regardless of whether the user of the mobile device is traveling in an automobile, a train pulled by a locomotive, an aircraft, or a watercraft.

The following detailed description together with the accompanying drawings will provide a better understanding of the nature and advantages of the present invention.

BRIEF DESCRIPTION

DETAILED DESCRIPTION

Figure 1:
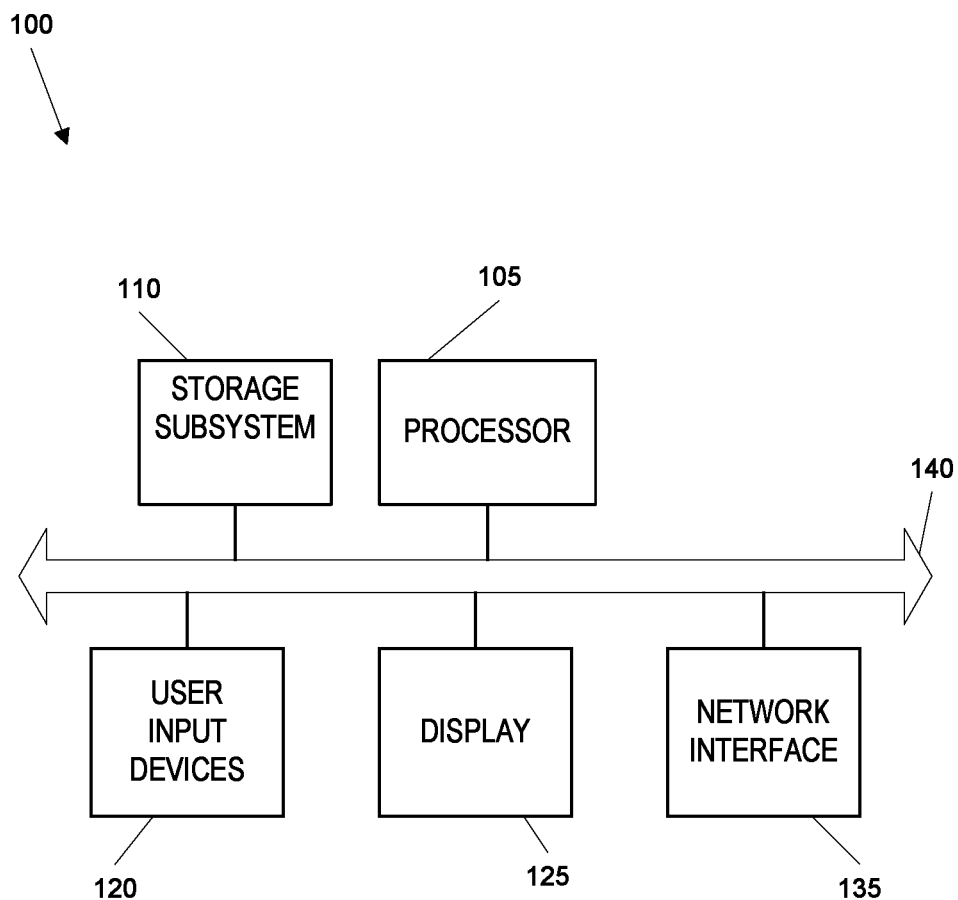
FIG. 1 is a block diagram of a computer system according to an embodiment of the present invention.

FIG. 1 illustrates a computing system 100 according to an embodiment of the present invention. Computing system 100 can be implemented as any of various computing devices, including, e.g., a desktop or laptop computer, tablet computer, smart phone, personal data assistant (PDA), or any other type of computing device, not limited to any particular form factor. Computing system 100 can include processing unit(s) 105, storage subsystem 110, input devices 120, display 125, network interface 135, and bus 140. Computing system 100 can be an iPhone or an iPad.

Processing unit(s) 105 can include a single processor, which can have one or more cores, or multiple processors. In some embodiments, processing unit(s) 105 can include a general-purpose primary processor as well as one or more special-purpose co-processors such as graphics processors, digital signal processors, or the like. In some embodiments, some or all processing units 105 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 105 can execute instructions stored in storage subsystem 110.

Storage subsystem 110 can include various memory units such as a system memory, a read-only memory (ROM), and a permanent storage device. The ROM can store static data and instructions that are needed by processing unit(s) 105 and other modules of computing system 100. The permanent storage device can be a read-and-write memory device. This permanent storage device can be a non-volatile memory unit that stores instructions and data even when computing system 100 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that the processor needs at runtime.

Storage subsystem 110 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (e.g., DVD-ROM, dual-layer DVD-ROM), read-only and recordable Blu-Ray® disks, ultra density optical disks, flash memory cards (e.g., SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 110 can store one or more software programs to be executed by processing unit(s) 105. "Software" refers generally to sequences of instructions that, when executed by processing unit(s) 105 cause computing system 100 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 110, processing unit(s) 105 can retrieves program instructions to execute and data to process in order to execute various operations described herein.

A user interface can be provided by one or more user input devices 120, display device 125, and/or and one or more other user output devices (not shown). Input devices 120 can include any device via which a user can provide signals to computing system 100; computing system 100 can interpret the signals as indicative of particular user requests or information. In various embodiments, input devices 120 can include any or all of a keyboard, touch pad, touch screen, mouse or other pointing device, scroll wheel, click wheel, dial, button, switch, keypad, microphone, and so on.

Display 125 can display images generated by computing system 100 and can include various image generation technologies, e.g., a cathode ray tube (CRT), liquid crystal display (LCD), light-emitting diode (LED) including organic light-emitting diodes (OLED), projection system, or the like, together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of display 125. Examples include indicator lights, speakers, tactile "display" devices, printers, and so on.

In some embodiments, the user interface can provide a graphical user interface, in which visible image elements in certain areas of display 125 are defined as active elements or control elements that the user can select using user input devices 120. For example, the user can manipulate a user input device to position an on-screen cursor or pointer over the control element, then click a button to indicate the selection. Alternatively, the user can touch the control element (e.g., with a finger or stylus) on a touchscreen device. In some embodiments, the user can speak one or more words associated with the control element (the word can be, e.g., a label on the element or a function associated with the element). In some embodiments, user gestures on a touch-sensitive device can be recognized and interpreted as input commands; these gestures can be but need not be associated with any particular array in display 125. Other user interfaces can also be implemented.

Network interface 135 can provide voice and/or data communication capability for computing system 100. In some embodiments, network interface 135 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 135 can provide wired network connectivity (e.g., Ethernet) in addition to or instead of a wireless interface. Network interface 135 can be implemented using a combination of hardware (e.g., antennas, modulators/demodulators, encoders/decoders, and other analog and/or digital signal processing circuits) and software components.

Bus 140 can include various system, peripheral, and chipset buses that communicatively connect the numerous internal devices of computing system 100. For example, bus 140 can communicatively couple processing unit(s) 105 with storage subsystem 110. Bus 140 also connects to input devices 120 and display 125. Bus 140 also couples computing system 100 to a network through network interface 135. In this manner, computing system 100 can be a part of a network of multiple computer systems (e.g., a local area network (LAN), a wide area network (WAN), an Intranet, or a network of networks, such as the Internet. Any or all components of computing system 100 can be used in conjunction with the invention.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 105 can provide various functionality for computing system 100. For example, processing unit(s) 105 can execute a network communication signal quality mapping application. In some embodiments, the network communication signal quality mapping application is a software-based process that can respond to imminent entry of computing system 100 into a region having low-quality or absent network communication availability by sending advisory notifications to other applications that have registered with the network communication signal quality mapping application.

It will be appreciated that computing system 100 is illustrative and that variations and modifications are possible. Computing system 100 can have other capabilities not specifically described here (e.g., mobile phone, global positioning system (GPS), power management, one or more cameras, various connection ports for connecting external devices or accessories, etc.). Further, while computing system 100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Travel-Anticipatory Data Pre-Caching

According to an embodiment of the invention, a mobile device can determine, based on both (a) geographical network communication signal quality information and (b) speed and heading information, that the mobile device might possibly enter a low-quality signal zone within a specified period of time in the future. In response to this determination, the mobile device can invoke a particular operating system feature. The invocation of the particular operating system feature can cause the operating system of the mobile device to instruct applications currently executing on the mobile device to begin pre-caching the data that those applications will require, or, more of the data that those applications are currently receiving via wireless communication networks. Applications can be designed to respond to such an operating system instruction by requesting more data from their data sources, and/or by consuming a greater portion of the mobile device's bandwidth in order to obtain such data. As used herein, the phrase "signal quality" can include, but is not limited to, the signal strength and noise levels of the mobile device's wireless transmission, the bit error rate of the encoded data on the channel, and the application-level throughput.

For example, in response to determining that the mobile device will enter a network communication signal "dead zone" within a specified threshold amount of time, the mobile device's operating system can instruct a music-streaming-and-playing application, such as Pandora, to begin to utilize an increased portion of the mobile device's network communication bandwidth to download and buffer data packets that contain information representing the music. In response, the music-streaming-and-playing application can download and buffer these data packets in greater quantities prior to the mobile device's entry into the network communication signal dead zone. Thereafter, while the mobile device is traveling through the network communication signal dead zone, the mobile device can continue to play music to its using the previously buffered information even though the mobile device currently cannot receive any network communication signal and even though the mobile device currently cannot receive any data packets wirelessly. For example, a particular movie-streaming application executing on a mobile device might normally buffer up to 5 minutes worth of content to play back to a user before temporarily ceasing to request more of that content over a wireless communication network. However, in response to an alert that the mobile device will be entering a network communication dead zone within a threshold amount of time from the present, the application can begin to buffer 10 minutes worth of content instead. As used herein, the phrase "dead zone" means a geographical area in which the mobile device cannot transmit or receive data wirelessly due to the absence of a signal transmitter/receiver within wireless communication range of the mobile device.

In an embodiment of the invention, the amount of increase in the quantity of data that an application buffers in response to detecting imminent entry into a region of poor network communication service quality can be based on a quantity of time that the mobile device on which the application executes is predicted to remain within that region. This predicted amount of time can be based on the size of the region, the speed and direction of the mobile device, and/or a known route that the mobile device is predicted to follow through that region. In an embodiment of the invention, an application pre-caches a sufficient quantity of data prior to entry into the poor signal quality region to enable the application to continue to play content at a normal rate (without acquiring any further data) during the entire interval of time that the mobile device is predicted to remain within the poor signal quality region.

Figure 2:
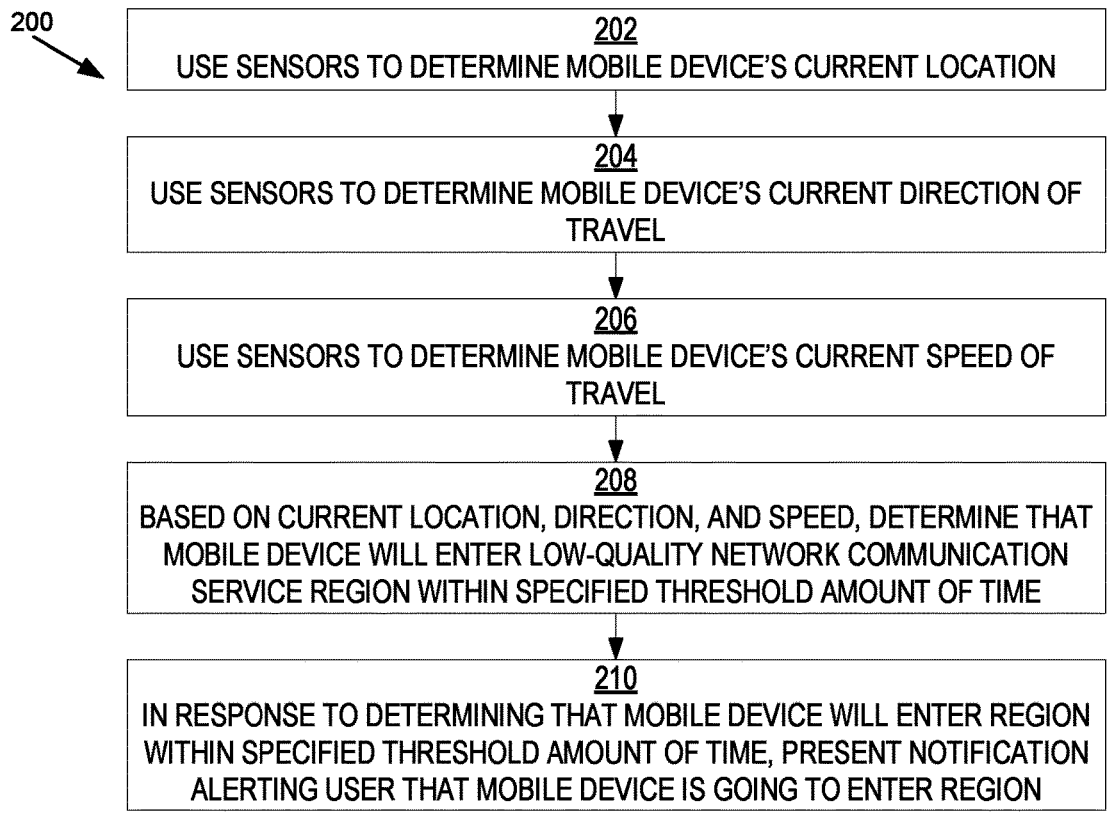
FIG. 2 is a flow diagram illustrating an example technique for responding to anticipated travel into a low-quality network communication service region based on a mobile device's sensor measurements, according to an embodiment of the invention.

FIG. 2 is a flow diagram illustrating an example technique 200 for responding to anticipated travel into a low-quality network communication service region based on a mobile device's sensor measurements, according to an embodiment of the invention. In block 202, the mobile device can use its sensors to determine the mobile device's current location. In block 204, the mobile device can use its sensors to determine the mobile device's current direction of travel. In block 206, the mobile device can use its sensors to determine the mobile device's current speed of travel. In block 208, based at least in part on the mobile device's current location, the mobile device's current direction of travel, and the mobile device's current speed of travel, the mobile device can determine that it will enter the region within a specified threshold amount of time. In block 210, in response to detecting that the mobile device will enter the region within the specified threshold amount of time, the mobile device can automatically present, on its display, a notification alerting the mobile device's user that the mobile device is going to enter the region.

Figure 3:
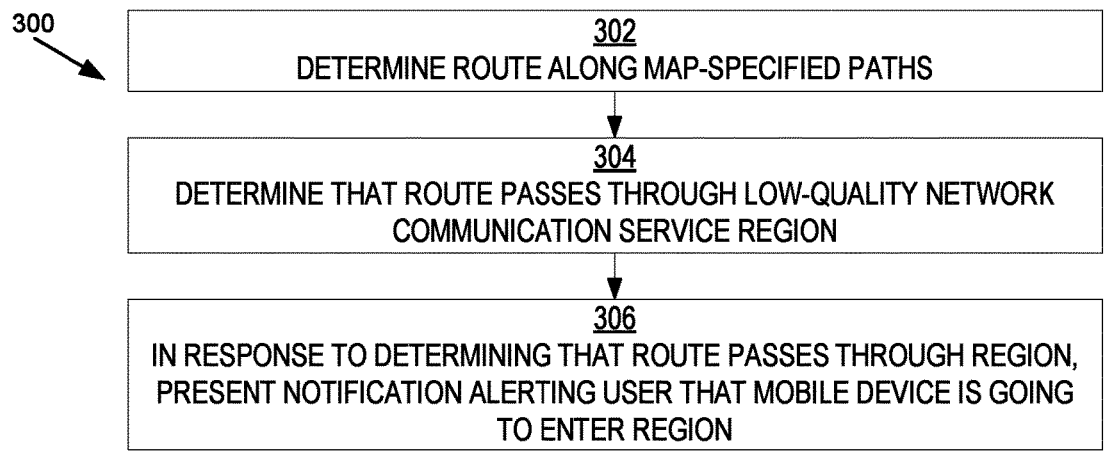
FIG. 3 is a flow diagram illustrating an example technique for responding to anticipated travel into a low-quality network communication service region based on a route that the mobile device has automatically charted, according to an embodiment of the invention.

FIG. 3 is a flow diagram illustrating an example technique 300 for responding to anticipated travel into a low-quality network communication service region based on a route that the mobile device has automatically charted, according to an embodiment of the invention. In block 302, the mobile device can automatically determine a route along map-specified paths. In block 304, the mobile device can determine that the route passes through the region. In block 306, in response to determining that the route passes through the region, the mobile device can automatically present, on its display, a notification alerting the mobile device's user that the mobile device is going to enter the region.

Figure 4:
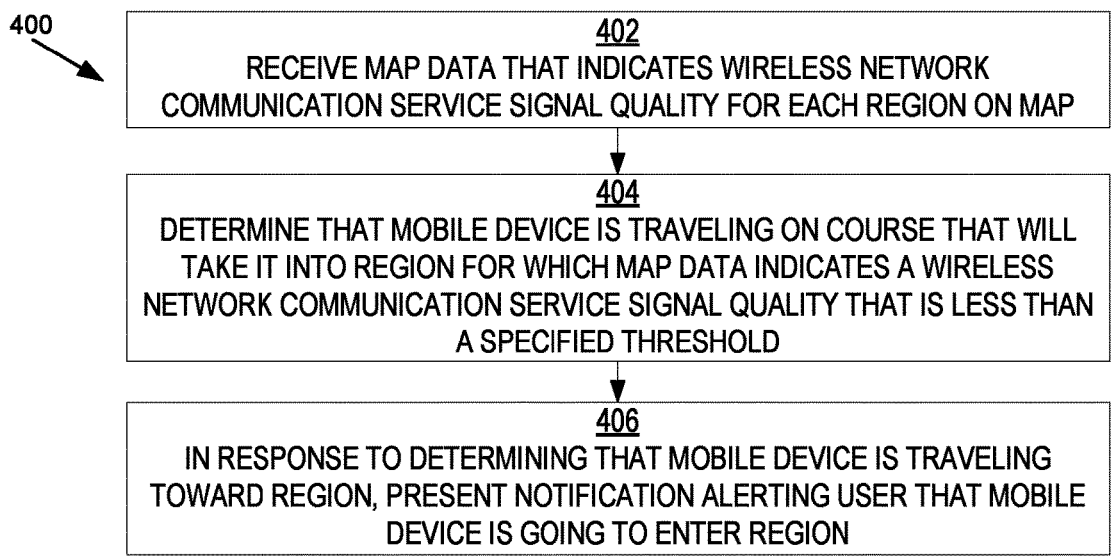
FIG. 4 is a flow diagram illustrating an example technique for responding to anticipated travel into a low-quality network communication service region based on downloaded map data, according to an embodiment of the invention.

FIG. 4 is a flow diagram illustrating an example technique 400 for responding to anticipated travel into a low-quality network communication service region based on downloaded map data, according to an embodiment of the invention. In block 402, the mobile device can receive map data that indicates, for each particular region designated within the map data, a wireless network communication service signal quality existing within that particular region. In block 404, the mobile device can determine that it is traveling on a course that will take it into a region for which the map data indicates a wireless network communication service signal quality that is less than a specified level of quality. In block 406, in response to detecting that the mobile device is traveling toward the region, the mobile device can automatically present, on its display, a notification alerting the mobile device's user that the mobile device is going to enter the region.

Figure 6:
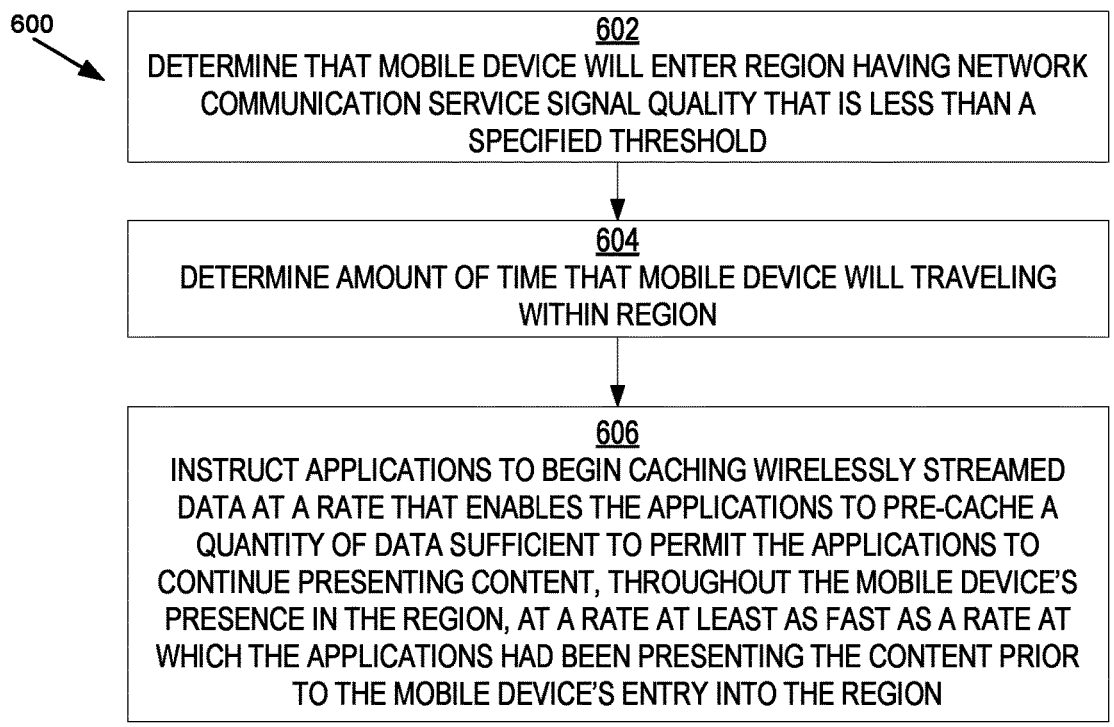
FIG. 6 is a flow diagram illustrating an example technique for instructing applications to more aggressively cache streaming data based on an amount of time that a mobile device is going to be traveling through a low-quality network communication service region, according to an embodiment of the invention.

FIG. 6 is a flow diagram illustrating an example technique 600 for instructing applications to more aggressively cache streaming data based on an amount of time that a mobile device is going to be traveling through a low-quality network communication service region, according to an embodiment of the invention. In block 602, the mobile device can determine that it is going to enter a region having a wireless network communication service signal quality that is less than a specified threshold. In block 604, the mobile device can determine an amount of time that it is going to be traveling within the region. In block 606, the mobile device can instruct applications to begin caching wirelessly streamed data at a rate that enables the applications to pre-cache a quantity of data sufficient to permit the applications to continue presenting content, throughout the mobile device's presence within the region, at a rate at least as fast as a rate at which the applications had been presenting the content prior to the mobile device's entry into the region.

Field of Potential Future Locations

In one embodiment of the invention, based on the mobile device's current location, speed, and direction, the mobile device can estimate a linear path that the mobile device is likely to follow. In response to determining that the path intersects a known region of poor or absent network communication signal quality, the mobile device can initiate data pre-caching in the manner discussed above. Additionally or alternatively, in one embodiment of the invention, at any given moment, the mobile device can calculate a field of potential future locations in which the mobile device could be present within a specified time interval following the present moment assuming that the mobile device's speed remained constant but that the mobile device's direction was subject to change during that time interval. In response to determining that this field of potential future locations intersects a known region of poor or absent network communication signal quality, the mobile device can initiate data pre-caching in the manner discussed above. In such an embodiment, as the mobile device's speed and location changes, the field of potential future locations can change accordingly. In one embodiment of the invention, a learning algorithm can adapt to changes in the speed at which the mobile device travels over time in order to further refine the accuracy of the field of potential future locations discussed above.

In one embodiment of the invention, the mobile device can refine the field of potential future locations discussed above based at least in part on information that indicates a type of environment in which the mobile device is currently located. This environment type can be specified within digitally stored map information, for example. The map information may indicate, for each region, a type of environment that exists within that region. For example, one region might contain a "city" environment type, while another region might contain an "open space" environment type. The narrowness of the field can be adjusted based on the environment type of the region in which the mobile device is currently located. For example, if the mobile device is currently located within a "city" environment type, then the mobile device can anticipate a field of potential future locations that more narrowly adheres to the mobile device's current linear trajectory than the mobile device would anticipate if the mobile device were currently located within an "open space" environment type.

In one embodiment of the invention, the mobile device can estimate a likelihood of change of direction based on the mobile device's current speed in order to calculate the field of potential future locations. For example, if the mobile device's current speed is relatively slow, then the mobile device can responsively estimate a relatively high likelihood that the mobile device's direction of travel may change, and construct the field of potential future locations accordingly; such a field of potential future locations might encompass regions in a relatively wide variety of directions about the mobile device's current direction, but at a relatively limited distance from the mobile device's current location. For another example, if the mobile device's current speed is relatively high, then the mobile device can responsively estimate a relatively low likelihood that the mobile device's direction of travel may change, and construct the field of potential future locations accordingly; such a field of potential future locations might encompass regions in a relatively narrow variety of directions about the mobile device's current direction, but at a relatively greater distance from the mobile device's current location. In one embodiment of the invention, the mobile device can receive user input that indicates a mode of transportation, and the mobile device can construct the field of potential future locations in a manner that takes this mode into account. For example, if the user input indicates that the mode of transportation is by train, then the mobile device can estimate the mobile device's potential future locations with a fairly high likelihood, due to the path of the rails being fixed and due to the train's speeds being relatively predetermined along its route.

In one embodiment of the invention, data obtained from the mobile device's sensors, potentially including the device's accelerometer, gyroscope, and barometer, can be used to estimate a context of travel. For example, using such data, the mobile device may estimate that the mobile device's user is currently walking, or jogging, or running, or bicycling, or driving, or flying. In one embodiment of the invention, the mobile device can construct the field of potential future locations based at least in part on the mobile device's current context of travel. For example, if the mobile device's current context of travel is walking, then the mobile device can responsively construct the field of potential future locations accordingly; such a field of potential future locations might encompass regions in a relatively wide variety of directions about the mobile device's current direction, but at a relatively limited distance from the mobile device's current location. For another example, if the mobile device's current context of travel is driving, then the mobile device can responsively construct the field of potential future locations accordingly; such a field of potential future locations might encompass regions in a relatively narrow variety of directions about the mobile device's current direction, but at a relatively greater distance from the mobile device's current location.

Figure 10:
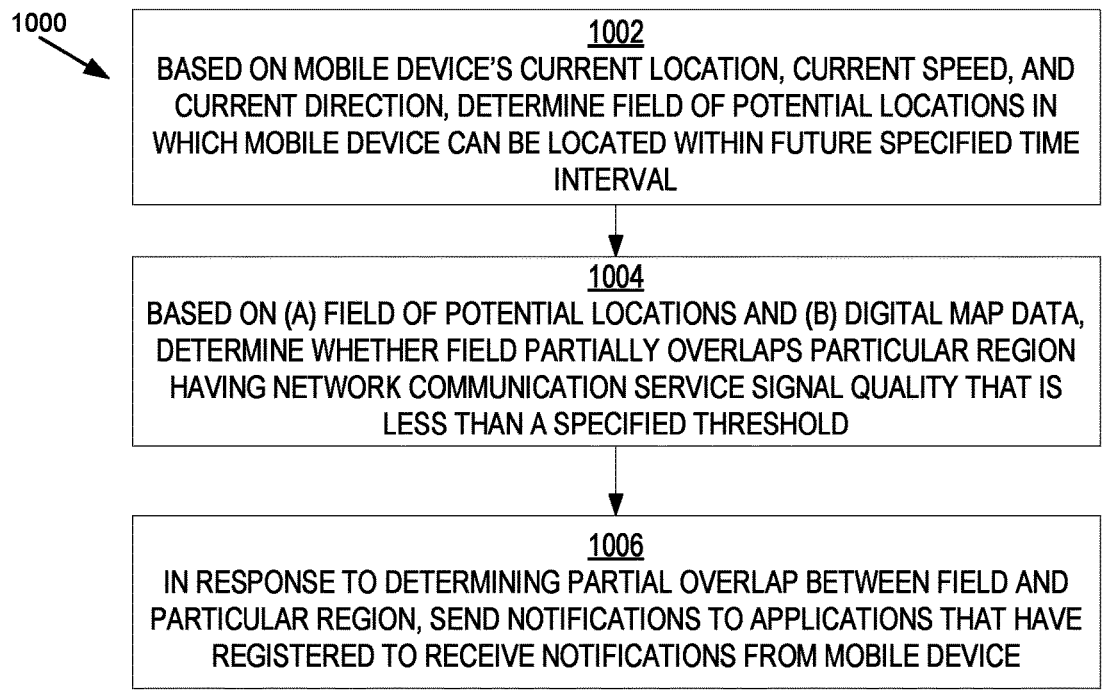
FIG. 10 is a flow diagram illustrating an example technique for detecting a mobile device's anticipated travel through a low-quality network communication service region based on a field of potential locations, according to an embodiment of the invention.

FIG. 10 is a flow diagram illustrating an example technique 1000 for detecting a mobile device's anticipated travel through a low-quality network communication service region based on a field of potential locations, according to an embodiment of the invention. In block 1002, based at least in part on (1) a current location of the mobile device, (2) a current speed of the mobile device, and (3) a current direction of the mobile device, the mobile device can determine a field of potential locations in which the mobile device can potentially be located within a specified interval of time following a current time. In block 1004, based at least in part on (a) the field of potential locations and (b) digital map data that indicates wireless network communication service signal qualities for regions in a plurality of regions, the mobile device can determine that the field of potential locations at least partially overlaps a particular region in which a wireless network communication service signal quality is less than a specified threshold. In block 1006, in response to determining that the field of potential locations at least partially overlaps a particular region in which a wireless network communication service signal quality is less than a specified threshold, the mobile device can send a notification to one or more applications that have registered to receive notifications.

Obtaining Relevant Map Information

According to an embodiment of the invention, a mobile device can estimate an amount of time during which the mobile device is likely to be in a geographical zone in which the mobile device will have either no wireless network access at all or access only to a network communication signal that is less than a specified threshold of quality or strength. In other words, in an embodiment of the invention, a mobile device can estimate how long it will be in a network communication signal dead zone sometime in the future.

In an embodiment of the invention, a navigation application executing on the mobile device can automatically determine a route of travel from a user-specified origin to a user-specified destination. The route of travel can follow one or more roads indicated on a map digitally stored within the mobile device. The map information digitally stored within the mobile device can specify, for each region of a plurality of regions into which the map is geographically divided, a network communication signal quality or strength that is known to exist within that region. Some regions might have greater signal qualities than other regions have. The route of travel can pass through one or more of these regions. In one embodiment of the invention, each region can be a square area on the map. In an alternative embodiment of the invention, each region can be a hexagonal area on the map.

In an embodiment of the invention, after the mobile device has determined the route along which it is probably going to travel, as described above, the mobile device can determine the set of regions, or map tiles, through which the route passes. The mobile device can then proactively and wirelessly download the signal quality or strength information for these particular regions, or for these particular map tiles, while the mobile device is still within a region in which the network communication signal quality is sufficiently high. The mobile device can then use this proactively obtained signal quality information for various purposes, such as for the data pre-caching purpose discussed above. In this manner, the mobile device ensures that it has signal quality information at least for the regions that are likely to be relevant, due to the mobile device's anticipated future travel through those regions.

As is discussed above, in an embodiment of the invention, a mobile device can determine a route along which that mobile device is predicted to travel. In such an embodiment, the route can be used to estimate times of entry into, and times of travel through, regions characterized by low-quality or absent network communication service availability. However, in alternative embodiments of the invention, other indicia of paths of travel can be used by the mobile device for similar purposes. For example, in one embodiment of the invention, a mobile device can execute a "passbook" type of application that stores digital boarding pass information and potentially other kinds of travel-related information for use during a user's transportation. In such an embodiment of the invention, the mobile device can observe the departure date and time, the origin of departure, the arrival date and time, and the destination of arrival associated with a digital boarding pass or other digital travel document stored within the passbook. Based on this observed information from the passbook, the mobile device can anticipate a potential path through various regions of a signal quality map at specific times and dates. Using this potential path information, the mobile device can initiate pre-caching, partial map downloading, or other anticipatory actions in advance of the mobile device's predicted entry into a region characterized by low-quality or absent network communication service availability. Virtually any source of data accessible by the mobile device and indicative of a travel context can be used by the mobile device to predict a future course of travel and to perform compensatory operations accordingly.

Figure 11:
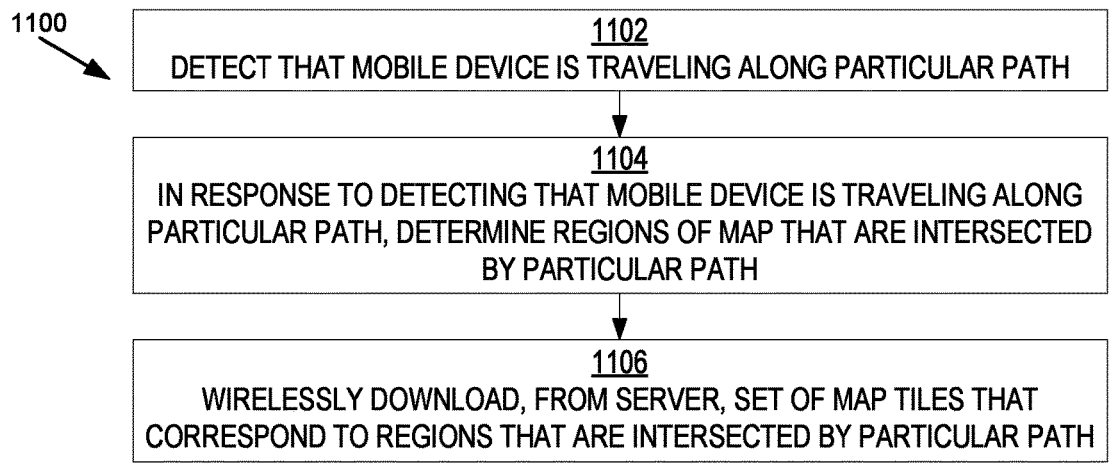
FIG. 11 is a flow diagram illustrating an example technique for obtaining relevant map information regarding network communication signal qualities within regions through which a mobile device is likely to travel, according to an embodiment of the invention.

FIG. 11 is a flow diagram illustrating an example technique 1100 for obtaining relevant map information regarding network communication signal qualities within regions through which a mobile device is likely to travel, according to an embodiment of the invention. In block 1102, the mobile device can detect that it is traveling along a particular path. In block 1104, in response to detecting that it is traveling along the particular path, the mobile device can determine regions of a map that are intersected by the particular path. In block 1106, the mobile device can wirelessly download, from a server, a set of map tiles that correspond to the regions that are intersected by the particular path. The set of downloaded map tiles can exclude all map tiles that do not correspond to the regions that are intersected by the particular path. The map tiles can specify qualities of network communication signals within regions to which those map tiles correspond.

Dual Techniques for Anticipating Dead Zones

In an embodiment of the invention, in response to determining that the route passes through one or more regions in which the network communication signal quality is less than a specified threshold level of quality, the mobile device can automatically instruct applications executing on the device to begin pre-caching data packets in the manner discussed above. The mobile device can issue this instruction even if the mobile device is not currently in motion, and even if the mobile device has not yet left its point of origin. Because the mobile device is apprised of its probable future passage through one or more network communication signal dead zones due to the passage of the route through regions including those dead zones, the mobile device can begin to cause data packet pre-caching for content streaming and downloading applications to begin regardless of the mobile device's current location, speed, or direction.

In an embodiment of the invention, the mobile device uses the route information discussed above in conjunction with the current location, speed, and direction information that the mobile device automatically determines using its sensors in order to determine whether and when to instruct content streaming and downloading applications to begin pre-caching data packets prior to entry into network communication signal dead zones. Each of these items of information can be a separate input into an algorithm or function that the mobile device uses to determine whether and when to instruct content streaming and downloading applications executing on the device to begin pre-caching data packets.

In one embodiment of the invention, if the mobile device is aware of a probable route of future travel due to a user's activation of an automatic route-determining mechanism, such as those found within automobile navigation applications, then the mobile device can use that route information along with the digital signal quality map in order to determine whether and when to instruct content streaming and downloading applications to begin pre-caching data packets. In such an embodiment of the invention, if the mobile device is unaware of such a probable route, potentially because the user has not activated an automatic route-determining mechanism, then the mobile device can alternatively use the current location, speed, and direction information determined using the mobile device's sensors in order to determine whether and when to instruct content streaming and downloading applications to begin pre-caching data packets.

Figure 5:
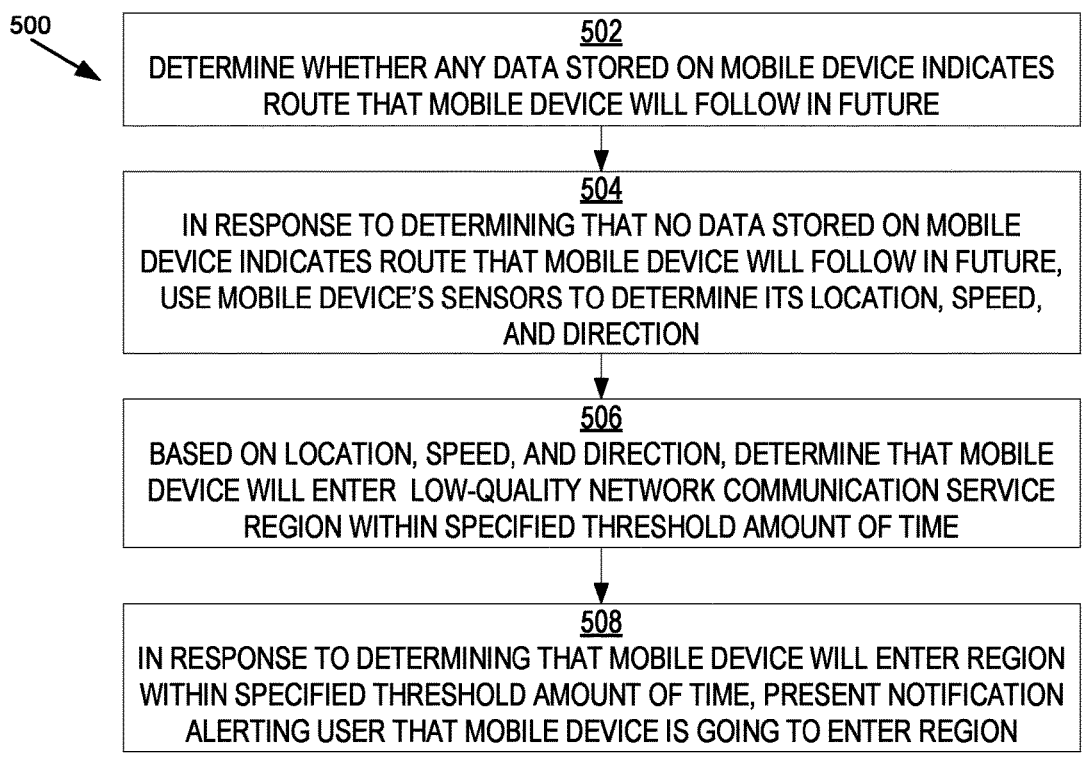
FIG. 5 is a flow diagram illustrating an example technique for selecting an approach for determining that a mobile device is going to travel into a low-quality network communication service region, according to an embodiment of the invention.

FIG. 5 is a flow diagram illustrating an example technique 500 for selecting an approach for determining that a mobile device is going to travel into a low-quality network communication service region, according to an embodiment of the invention. In block 502, the mobile device can determine whether any data stored on the mobile device indicates a route that the mobile device will follow in the future. In block 504, in response to determining that no data stored on the mobile device indicates a route that the mobile device will follow in the future, the mobile device can use its sensors to determine its location, speed, and direction. In block 506, based at least in part on the sensor-determined location, speed, and direction, the mobile device can determine that it will enter the region within a specified threshold amount of time. In block 508, in response to detecting that the mobile device will enter the region within the specified threshold amount of time, the mobile device can automatically present, on its display, a notification alerting the mobile device's user that the mobile device is going to enter the region.

Building Map Data Through Crowd-Sourcing

According to an embodiment of the invention, a crowd-sourcing technique can be used in order to build the network communication signal quality map data discussed above. In such an embodiment, actual experiential data transmitted from multiple separate mobile devices can be used to construct the map data. For example, as each mobile device in a set of many mobile devices travels through various regions located on a map, that mobile device can measure the network communication signal quality or strength that it experiences within those regions. Each such mobile device can then upload, to a remote server, information that specifies the device-experienced signal quality or strength for the regions in which that mobile device actually conducted measurements. For example, a mobile device can upload, to the remote server, information indicating that while the mobile device was located in a particular region, the mobile device experienced a particular bandwidth in its wireless data transmissions, and/or the mobile device detected a wireless signal having a strength or quality measured by a particular quantity of "bars." The remote server can accumulate and aggregate this information, using the measurements from multiple separate mobile devices to populate network communication signal quality measurements for various regions within the map data. Other mobiles devices, as well as the mobile devices that uploaded some of the measurements to the remote server, can then obtain the map data, at least partially populated using the crowd-sourcing techniques described above, from the remote server. For example, the mobile devices can periodically download the map data, or relevant portions thereof, from the remote server over a wireless network.

In one embodiment of the invention, each mobile device in the set of mobile devices can anonymize the signal quality measurements that it sends to the remote server prior to sending those measurements. Each such mobile device can remove, from the measurements that it sends to the remote server, all information that could be used to identify the mobile device or the mobile device's user. In one embodiment of the invention, each mobile device can send, to the remote server, only (a) the mobile device's geographical coordinates at the time of the measurement and (b) the data indicating the measured signal quality or strength at those coordinates. In other embodiments, each mobile device can send other potentially useful information to the remote server as well, such as the time of day at which the signal quality was measured, the date on which the signal quality was measured, the kind of network (e.g., 3G, 4G, etc.) whose signal quality was measured, the carrier of the network (e.g., Verizon, AT&T, T-Mobile, etc.) whose signal quality was measured, etc. In an embodiment of the invention, a mobile device can first request and obtain, from its user, consent to share signal quality measurement data with the remote server and other mobile devices before sending such measurement data to the remote server periodically or in response to specified event triggers.

In one embodiment of the invention, the remote server can enhance and update the signal quality information within the map information based on the measurements received from various mobile devices, but also can initially populate the map information with signal quality data obtained from one or more cell phone carriers. For example, the remote server can obtain, from companies such as Verizon, AT&T, T-Mobile, etc., information indicating the locations of the cell towers that server those companies' wireless communication networks. The remote server can obtain, from these carriers, measurements of the levels of signal quality and strength surrounding each tower. Alternatively, the remote server can estimate these measurements based simply on the locations of the cell towers and the distances of each map region from the regions in which the cell towers are located. The remote server can initially populate the map information with these carrier-provided signal quality measurements, which can be theoretical estimates based primarily on antenna location and direction. Then, as mobile devices begin to upload their own measurements, the remote server can update the map information based on those measurements. In one embodiment of the invention, the remote server can maintain a separate network communication signal quality map for each of the carriers, because different carriers can have cell towers located in different regions. In such an embodiment, the remote server can determine which carrier a particular mobile device uses in response to receiving signal quality measurement data from that particular mobile device, and then use that signal quality measurement data to update the network communication signal quality map only for that carrier, because the measurement data from the particular mobile device pertains only to that carrier's wireless communication networks. In an embodiment of the invention, each mobile device subscribing to a particular carrier's network can initially download from the remote server and locally store, in its memory, the signal quality map data pertaining specifically to that particular carrier; such map data can be initially populated by the remote server using signal quality measurements from the particular carrier itself.

Figure 12:
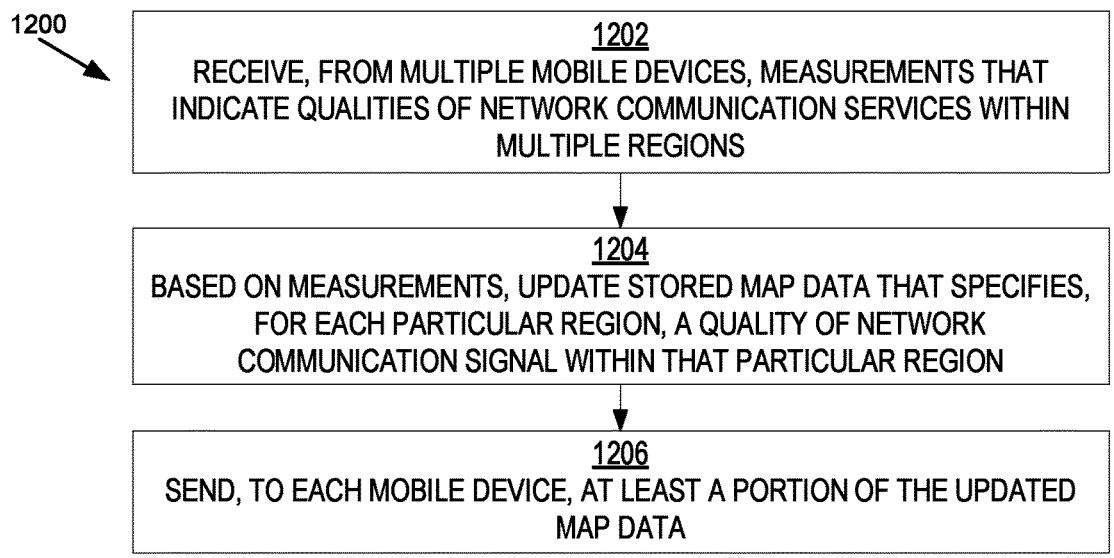
FIG. 12 is a flow diagram illustrating an example technique for generating a network communication signal quality map based on signal quality measurements uploaded from various mobile devices, according to an embodiment of the invention.

FIG. 12 is a flow diagram illustrating an example technique 1200 for generating a network communication signal quality map based on signal quality measurements uploaded from various mobile devices, according to an embodiment of the invention. In block 1202, a server can receive, from multiple mobile devices, measurements that indicate qualities of network communication signals within multiple regions. For example, the server can receive (1) a first measurement pertaining to a particular region from a first mobile device and (2) a second measurement pertaining to the particular region from a second mobile device that is separate from the first mobile device. For another example, the server can receive, from the same mobile device, (1) a first measurement pertaining to a first region, and (2) a second measurement pertaining to a second region that is separate from the first region.

In block 1204, based on the measurements, the server can update stored map data that specifies, for each particular region, a quality of a network communication signal within that particular region. In block 1206, the server can send, to each of the mobile devices (and potentially others also), at least a portion of the stored map data that was updated in block 1204.

Figure 7:
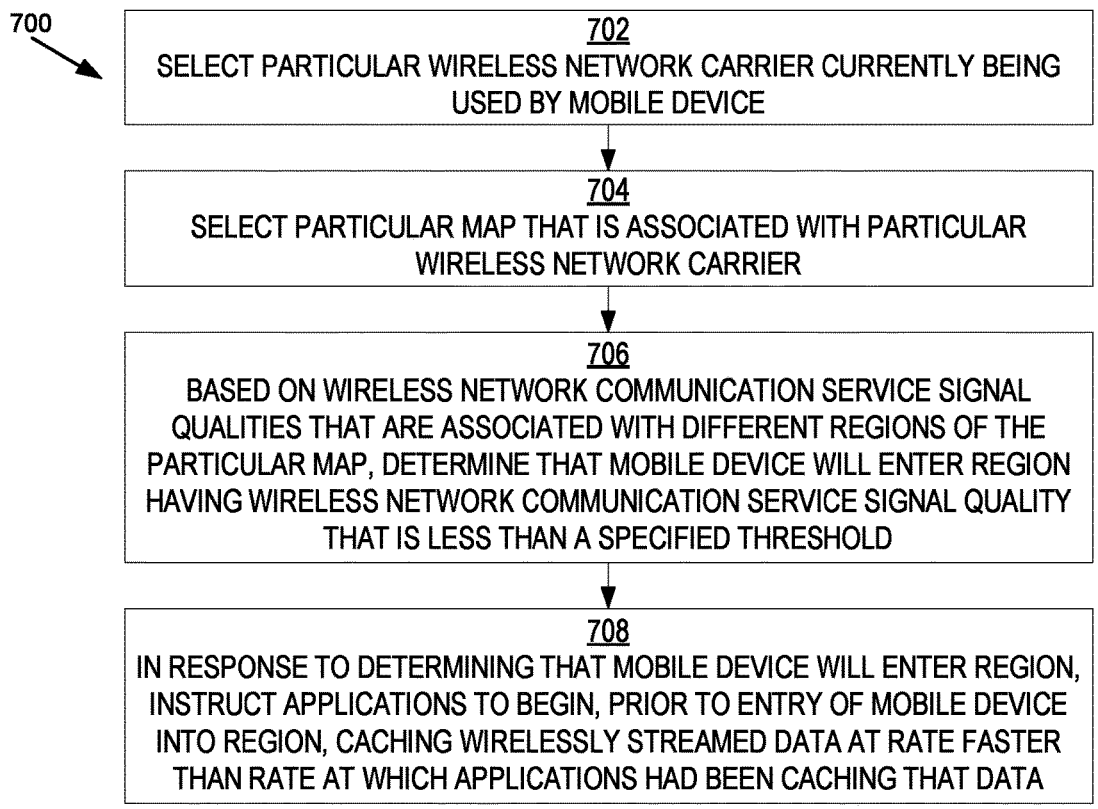
FIG. 7 is a flow diagram illustrating an example technique for instructing applications to more aggressively cache streaming data based on wireless carrier-specific map data used to detect a mobile device's anticipated travel through a low-quality network communication service region, according to an embodiment of the invention.

FIG. 7 is a flow diagram illustrating an example technique 700 for instructing applications to more aggressively cache streaming data based on wireless carrier-specific map data used to detect a mobile device's anticipated travel through a low-quality network communication service region, according to an embodiment of the invention. In block 702, the mobile device can select, from among a plurality of wireless network carriers, a particular wireless network carrier that is currently being used by the mobile device. In block 704, the mobile device can select, from among a plurality of maps that are associated with different wireless network carriers, a particular map that is associated with the particular network carrier. In block 706, based at least in part on wireless network communication service signal qualities that are associated with different regions of the particular map, the mobile device can determine that it is going to enter a region having a wireless network communication service signal quality that is less than a specified threshold. In block 708, in response to determining that it is going to enter the region, the mobile device can instruct applications to begin, prior to the entry of the mobile device into the region, caching wirelessly streamed data at a rate faster than a rate at which the one or more applications had been caching wirelessly streamed data.

In one embodiment of the invention, the remote server can maintain a separate network communication signal quality map for each different network technology type (e.g., 2G, 3G, 4G, etc.), because different network technology types can have different wireless communication signal qualities within a particular region. In such an embodiment, the remote server can determine which network technology type (e.g., 2G, 3G, 4G, etc.) a particular mobile device used in response to receiving signal quality measurement data from that particular mobile device, and then use that signal quality measurement data to update the network communication signal quality map only for that particular network technology type, because the measurement data from the particular mobile device pertains only to that particular network technology type. In an embodiment of the invention, the remote server maintains and updates a separate wireless network communication signal quality map for each possible permutation of wireless service carrier and wireless network technology type (e.g., Verizon 3G, AT&T 3G, Verizon 4G, AT&T 4G, etc.).

In one embodiment of the invention, the remote server can maintain a separate network communication signal quality map for each different time-of-day and day-of-week combination, because network congestion might be more severe during certain times-of-day and days-of-week than at other times-of-day on other days-of-week. In such an embodiment, the remote server can determine the particular timeof-day and day-of-week at which a particular mobile device made a signal quality measurement in response to receiving signal quality measurement data from that particular mobile device, and then use that signal quality measurement data to update the network communication signal quality map only for that particular time-of-day and day-of-week combination, because the measurement data from the particular mobile device pertains only to that particular time-of-day and that particular day-of-week. In an embodiment of the invention, the remote server maintains and updates a separate wireless network communication signal quality map for each possible permutation of wireless service carrier, wireless network technology type, and time-of-day/day-of-week combination. In such an embodiment, when attempting to determine whether a mobile device is soon likely to enter a region having limited or lacking network communication service availability, as discussed above, that mobile device can download (e.g., from the remote server) fresh map data specifically for the permutation that is presently applicable to that mobile device's current situation (e.g., for the mobile device's current carrier, current network technology type, and the current time-of-day and day-of-week), and use that situation-specific map data to make the determination.

Figure 8:
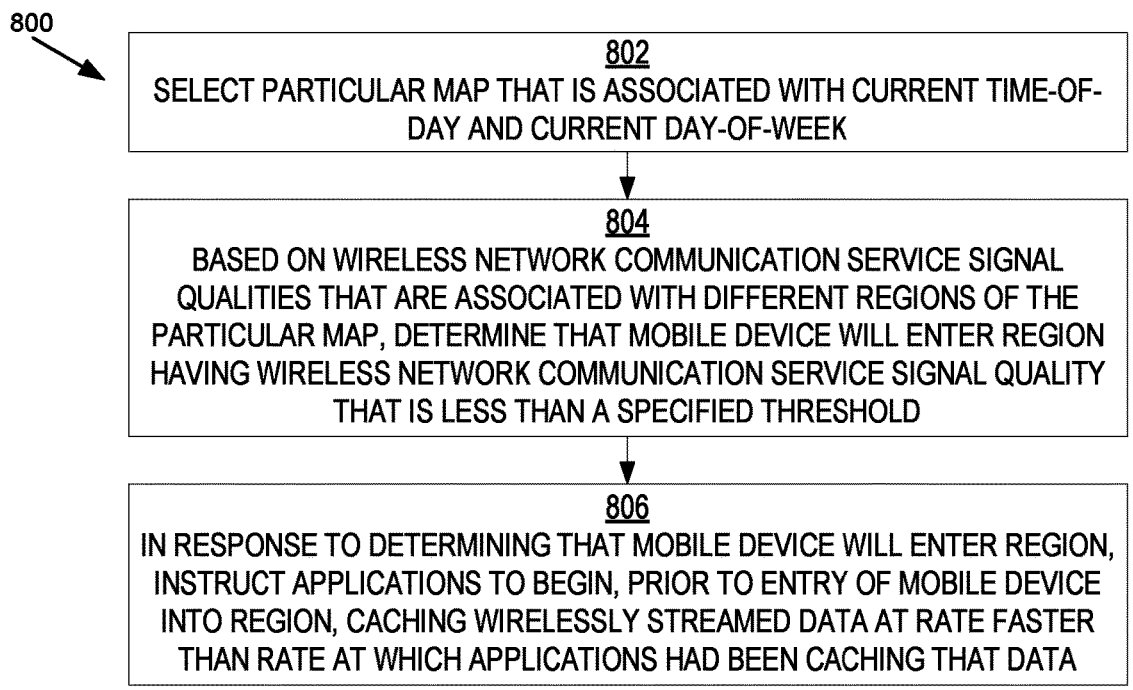
FIG. 8 is a flow diagram illustrating an example technique for instructing applications to more aggressively cache streaming data based on time-and-day-specific map data used to detect a mobile device's anticipated travel through a low-quality network communication service region, according to an embodiment of the invention.

FIG. 8 is a flow diagram illustrating an example technique 800 for instructing applications to more aggressively cache streaming data based on time-and-day-specific map data used to detect a mobile device's anticipated travel through a low-quality network communication service region, according to an embodiment of the invention. In block 802, the mobile device can select, from among a plurality of maps that are associated with different time-of-day and day-of-week combinations, a particular map that is associated with a current time-of-day and a current day-of-week. In block 804, based at least in part on wireless network communication service signal qualities that are associated with different regions of the particular map, the mobile device can determine that it is going to enter a region having a wireless network communication service signal quality that is less than a specified threshold. In block 806, in response to determining that it is going to enter the region, the mobile device can instruct applications to begin, prior to the entry of the mobile device into the region, caching wirelessly streamed data at a rate faster than a rate at which the one or more applications had been caching wirelessly streamed data.

As is mentioned above, in one embodiment of the invention, mobile devices can report their geographical coordinates to the remote server along with network communication signal quality measurements pertaining to those coordinates. In one embodiment of the invention, these mobile devices can use mechanisms other than GPS in order to determine these coordinates. For example, in one embodiment of the invention, mobile devices can determine their locations using cell identifiers (IDs)—identifiers uniquely associated with the cell towers through which those mobile devices wirelessly access the network. For another example, in one embodiment of the invention, mobile devices can determine their locations based on WiFi Internet Protocol (IP) addresses of the WiFi access points through which those mobile devices wirelessly access the network. Avoiding the use of GPS to determine a mobile device's current coordinates can help to preserve the mobile device's battery life.

Thus, in certain embodiments of the invention, crowd-sourced data can be transformed into a network communication service map. Using various measurements from different fields, regional polygons specifying service qualities in various regions of the map can be populated. Various filters can be applied to the measurements in populating the map. Various algorithms can be applied to generate the service quality levels for each regional polygon within the map. For example, in one embodiment, a weight can be associated with each measurement based on how recently that measurement was observed; more recently observed measurements can be weighted more heavily than less recently observed measurements. Each measurement can be multiplied by its associated weight, and then the resulting weighted measurements can be averaged together to produce the service quality level for a particular regional polygon within the map. After the network communication service map has been generated, the map can be obtained by mobile devices that are located within the field and used to anticipate and compensate for potential entry into regions of low-quality or no service, such as by instructing applications executing on those mobile devices to buffer extra data packets prior to such potential entry. In certain embodiments of the invention, algorithms can be used to determine probable direction of travel so that mobile devices can wirelessly download, from the remote server, map tiles that indicate service qualities of the regions through which the mobile devices are most likely to travel in the near future. In an embodiment of the invention, an operating system executing on the mobile device provides a service to applications through which this buffering and downloading can be accomplished. The operating system-provided service can be exposed to the application in the form of one or more application programming interfaces (APIs).

Application Registration

According to an embodiment of the invention, certain applications that execute on a mobile device can register with the operating system that is executing on that device to request crowd-sourcing and data buffering services offered by that operating system. For example, by registering with the operating system, a particular application can indicate to the operating system that the particular application is a content-streaming application that is interested in receiving alerts that the particular application should buffer extra data packets in anticipation of poor or absent network communication signals in the near future. In an embodiment of the invention, for each application that has registered in this manner with the operating system, the operating system sends an alert to that application in response to a module determining that the mobile device will be entering a region having less than a specified quality of wireless network communication services within a specified threshold amount of time. In one embodiment of the invention, five minutes prior to the moment in which the mobile device is predicted to enter a poor network communication service quality region, the operating system can send a notification to each of the registered applications instructing them to begin aggressive buffering. In one embodiment of the invention, the operating system also can indicate, in the notification, a predicted amount of time that the mobile device is predicted to remain within that region, so that registered applications can pre-cache a sufficient quantity of data to allow them to continue to present content at a normal rate throughout the time that the mobile device is predicted to remain within that region.

Device Tethering

Some mobile devices, such as some smart phones, come equipped with the capability of acting as a wireless network communication access point, or "hot spot," for other nearby devices capable of communicating wirelessly (e.g., via Bluetooth technology) with those mobile devices. In an embodiment of the invention, the mobile device to which other devices are tethered can send alerts to those tethered devices in the same manner that the mobile device's own operating system can send such alerts to registered applications that are executing on the mobile device itself. For example, applications executing on a tethered device can register with an operating system of a mobile device to which that tethered device is tethered in order to make use of the predictive alert services offered by that mobile device. The mobile device's operating system can send "impending dead zone entry" alerts to the registered applications executing on these tethered devices in a manner similar to that in which the mobile device's operating system sends such alerts to registered application executing locally on the mobile device itself. For example, registered applications can execute on a laptop computer that is wirelessly tethered to a mobile device and is using the mobile device's wireless communication services. For another example, registered application can execute on a vehicle's built-in navigation system that is wirelessly tethered to a mobile device and is using the mobile device's wireless communication services. The mobile device can provide a registration system for applications executing on tethered devices.

According to an embodiment of the invention, the mobile device's operating system listens on a particular port for registration requests from applications that can execute on the mobile device itself or on wirelessly tethered devices. In response to receiving these registration requests, the mobile device's operating system adds identifiers of these applications to a list of registered applications. Thereafter, whenever the mobile device's operating system determines that entry into a network communication signal dead zone is approaching, the mobile device's operating system can send out alerts or notifications on the particular port. Registered applications executing on tethered devices and on the mobile device itself can listen for such alerts or notifications on the particular port, and can respond to those alerts or notifications in application-customized manners (e.g., buffering additional data packets, notifying a user of the application, etc.). In an embodiment of the invention, registration and notification can be conducted using Hypertext Transfer Protocol (HTTP) over Internet Protocol (IP). However, in alternative embodiments of the invention, different protocols can be used for these purposes.

Figure 9:
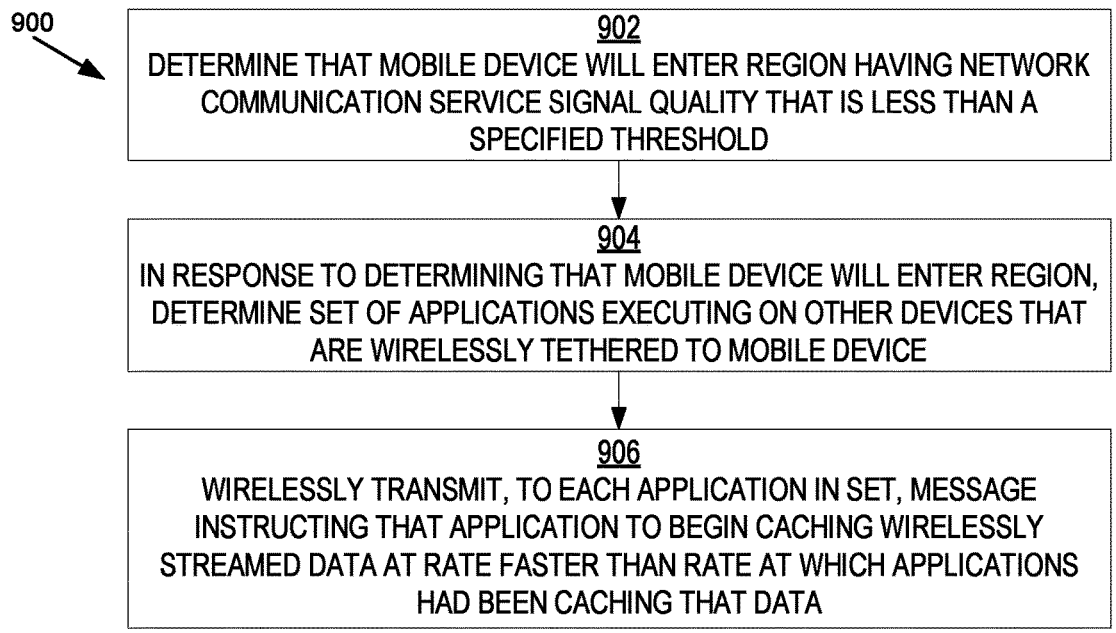
FIG. 9 is a flow diagram illustrating an example technique for instructing applications executing on devices wirelessly tethered to a mobile device to more aggressively cache streaming data in response to a mobile device's anticipated travel through a low-quality network communication service region, according to an embodiment of the invention.

FIG. 9 is a flow diagram illustrating an example technique 900 for instructing applications executing on devices wirelessly tethered to a mobile device to more aggressively cache streaming data in response to a mobile device's anticipated travel through a low-quality network communication service region, according to an embodiment of the invention. In block 902, the mobile device can determine that it is going to enter a region having a wireless network communication service signal quality that is less than a specified threshold. In block 904, in response to determining that it is going to enter the region, the mobile device can determine a set of applications that are executing on devices that are wirelessly tethered to the mobile device. In block 906, the mobile device can wirelessly transmit, to each application in the set of applications, a message instructing that application to begin caching wirelessly streamed data at a rate faster than a rate at which that application had been caching wirelessly streamed data.

Anticipatory Actions for Different Service Types

As is discussed above, in an embodiment of the invention, notifications are provided to content-streaming applications in anticipation of the impending entry of a mobile device into a region characterized by a low quality of network communication service availability. However, in various embodiments of the invention, such notifications may be provided to applications of a variety of different types, regardless of whether those applications are content-streaming applications. Other types of applications also can benefit from the notifications discussed above. For example, a text messaging application can register to receive such notifications. For another example, a telephony application can register to receive such notifications. What each registered application does in response to receiving such a notification can depend on that application's type.

For example, a "reminders" application executing on a mobile device such as a smart phone can register to receive notifications about the mobile device's imminent entry into a region of poor quality communication services, including voice communication services as well as data communication services. In response to receiving a notification that the mobile device will be entering such a region within five minutes and is predicted to remain within that region for thirty minutes, the reminders application can search its list of scheduled reminders for reminders that (a) will require communication services (such as reminders to make telephone calls) and (b) are scheduled to occur during the interval of time during which those communication services are predicted to be limited or lacking in availability. For each such reminder, the reminders application can take some pre-emptive action. For example, the reminders application can temporally move, to the present time, all such scheduled reminders, so that those particular reminders trigger immediately, while the mobile device can still access communication services, rather than at those reminders' regularly scheduled times, during which the mobile device likely will not be able to access communication services. As a result, for example, a user of the mobile device can be reminded to make a telephone call while the mobile device is still within an area in which telephone calls can be made.

For another example, an application executing on a vehicle's navigation system that is tethered to a mobile device such as a smart phone can register to receive notifications about the mobile device's imminent entry into a region of poor quality communication services. The vehicle's navigation system can benefit from such knowledge in order to become aware of future times during which the system will not be able to use wireless communication network services to search for gas stations at which the vehicle can be refueled. In response to receiving a notification that the mobile device will be entering such a region within five minutes and is predicted to remain within that region for thirty minutes, the vehicular navigation system can measure the amount of fuel that the vehicle currently has in its tank, and can proactively search for gas stations along the route or in the regions through which the vehicle is predicted to travel during those thirty minutes. The vehicular navigation system can determine, based on all of this information, whether the vehicle will need to stop at one of these gas stations in order to refuel before the tank becomes empty. The vehicular navigation system can then notify its user of such a need, and of the location of nearby gas stations, in advance of the time that the mobile device and the vehicle carrying it enter into the region of poor quality communication services. Thus, by registering for such notifications from the mobile device, the vehicular navigation system can avoid being caught in a predicament in which the system failed to alert the user of the need to refuel because the system was unable to use a wireless communication network to search for the closest gas stations at the time that the system detected a low fuel level in the vehicle's gas tank.

Adjusting for Network Technology Types

As is discussed above, in an embodiment of the invention, the remote server maintains a separate network communication service quality map for each different network technology type (e.g., 2G, 3G, 4G, etc.). These maps can indicate the available throughput that is anticipated to be available for each region within the map; different network technology types have different throughput capabilities. In an embodiment of the invention, based on this information, a mobile device can determine the average throughput that will be available to its applications along its anticipated course or route of travel. In an embodiment of the invention, the mobile device can use this throughput information to determine an amount of time, prior to entry into a particular low quality network communication signal region, which the mobile device will need in order to notify registered applications to commence aggressive data buffering. For example, if the throughput available on the mobile device's route is relatively low, then the registered applications can benefit from receiving pre-caching advisories earlier along the route, permitting those applications to pre-cache a sufficient quantity of data prior to entering a low quality network communication signal region.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method of obtaining wireless network communication signal quality map data, the method comprising:
    determining, by a mobile device, a geographical destination of a user of the mobile device;
    wirelessly downloading to the mobile device, from a server, map data corresponding to a path from a geographical origin location of the mobile device to the geographical destination, wherein the map data is based on measurements that the server received from a plurality of mobile devices that traveled in a region including the path from the geographical origin location to the geographical destination, the measurements indicating qualities of network communication signals within the path from the geographical origin location to the geographical destination; and
    based on the measurements, sending one or more notifications to one or more applications operating on the mobile device.

2. The method according to claim 1, wherein in response to the measurements indicating a low-quality signal zone along the path, pre-caching data for an application currently operating on the mobile device.

3. The method according to claim 1, wherein in response to the measurements indicating a low-quality signal zone along the path, pre-caching data for an application that will operate while the mobile device is traveling along the path.

4. The method according to claim 1, further comprising:
    determining an amount of time the mobile device will travel in a low-quality signal zone; and
    in response to receiving the one or more notifications, pre-caching data configured for the one or more applications based on the amount of time a mobile device will travel in the low-quality signal zone.

5. The method according to claim 4, wherein the pre-caching the data is performed before the mobile device travels along the path.

6. The method according to claim 4, wherein the pre-caching the data is performed while the mobile device is traveling along the path.

7. The method according to claim 1, wherein in response to the measurements indicating a low-quality signal zone along the path, increasing a portion of a network communication bandwidth of the mobile device in order to download and buffer data packets for the one or more applications.

8. The method according to claim 1, wherein the measurements indicating qualities of network communication signals include measurements regarding at least one of a wireless single strength, a noise level, a bit error rate, and an application-level throughput.

9. The method according to claim 1, wherein the map data is populated with mobile phone carrier signal data and signal data from the plurality of mobile devices.

10. The method according to claim 1, wherein in response to the measurements indicating a low-quality signal zone along the path, triggering reminders in a reminder application on the mobile device before entry in the low-quality signal zone.

11. The method according to claim 1, wherein the map data corresponding to the path from the geographical origin location of the mobile device to the geographical destination comprises different map data for each of a plurality of different days and times of travel along the path.

12. A computer-readable storage medium storing instructions which, when executed by one or more processors, cases the one or more processors to perform:
    determining, by a mobile device, a geographical destination of a user of the mobile device;
    wirelessly downloading to the mobile device, from a server, map data corresponding to a path from a geographical origin location of the mobile device to the geographical destination, wherein the map data is based on measurements that the server received from a plurality of mobile devices that traveled in a region including the path from the geographical origin location to the geographical destination, the measurements indicating qualities of network communication signals within the path from the geographical origin location to the geographical destination; and based on the measurements, sending one or more notifications to one or more applications operating on the mobile device.

13. The computer-readable storage medium according to claim 12, wherein in response to the measurements indicating a low-quality signal zone along the path, pre-caching data for an application currently operating on the mobile device.

14. The computer-readable storage medium according to claim 12, wherein in response to the measurements indicating a low-quality signal zone along the path, pre-caching data for an application that will operate while the mobile device is traveling along the path.

15. The computer-readable storage medium according to claim 12, further comprising:

determining an amount of time the mobile device will travel in a low-quality signal zone; and in response to receiving the one or more notifications, pre-caching data configured for the one or more applications based on the amount of time a mobile device will travel in the low-quality signal zone.

16. The computer-readable storage medium according to claim 15, wherein the pre-caching the data is performed before the mobile device travels along the path.

17. The computer-readable storage medium according to claim 12, wherein in response to the measurements indicating a low-quality signal zone along the path, increasing a portion of a network communication bandwidth of the mobile device in order to download and buffer data packets for the one or more applications.

18. The computer-readable storage medium according to claim 12, wherein the measurements indicating qualities of network communication signals include measurements regarding at least one of a wireless single strength, a noise level, a bit error rate, and an application-level throughput.

19. The computer-readable storage medium according to claim 12, wherein the map data is populated with mobile phone carrier signal data and signal data from the plurality of mobile devices.

20. The computer-readable storage medium according to claim 12, wherein the map data corresponding to the path from the geographical origin location of the mobile device to the geographical destination comprises different map data for each of a plurality of different days and times of travel along the path.

21. A mobile device including a processor and a memory having instructions stored thereon, that, if executed by the processor, causes the mobile device to perform operations comprising:

determining, by the mobile device, a geographical destination of a user of the mobile device;

wirelessly downloading to the mobile device, from a server, map data corresponding to a path from a geographical origin location of the mobile device to the geographical destination, wherein the map data is based on measurements that the server received from a plurality of mobile devices that traveled in a region including the path from the geographical origin location to the geographical destination, the measurements indicating qualities of network communication signals within the path from the geographical origin location to the geographical destination; and based on the measurements, sending one or more notifications to one or more applications operating on the mobile device.

* * * * *